United States Patent [19]

Hunter

[11] 4,095,837
[45] Jun. 20, 1978

[54] AIR PARTITION FOR AUTOMOBILE PASSENGER COMPARTMENTS

[76] Inventor: Harry E. Hunter, 164 Ball Farm Rd., Oakville, Conn. 06779

[21] Appl. No.: 727,245

[22] Filed: Sep. 27, 1976

[51] Int. Cl.² ............................................. B62D 33/04
[52] U.S. Cl. ..................................... 296/24 R; 49/404
[58] Field of Search ................ 296/24 R; 49/404, 409

[56] References Cited
U.S. PATENT DOCUMENTS 3,469,090 9/1969 Redus ................................. 296/24 R Primary Examiner—Philip Goodman
Attorney, Agent, or Firm—Robert D. Farkas

[57] ABSTRACT

A partition for segregating the air space within the passenger compartment of an automobile or the like relative to the passenger seats thereof including an elongated upper support track for affixment to the inner roof portion of an automobile, a plurality of side brackets for removable affixment to the opposed inner wall portions of the automobile, and a transparent curtain secured on the free lateral edges thereof to the plurality of side brackets, and on the uppermost free edge thereof to the upper support track.

7 Claims, 5 Drawing Figures

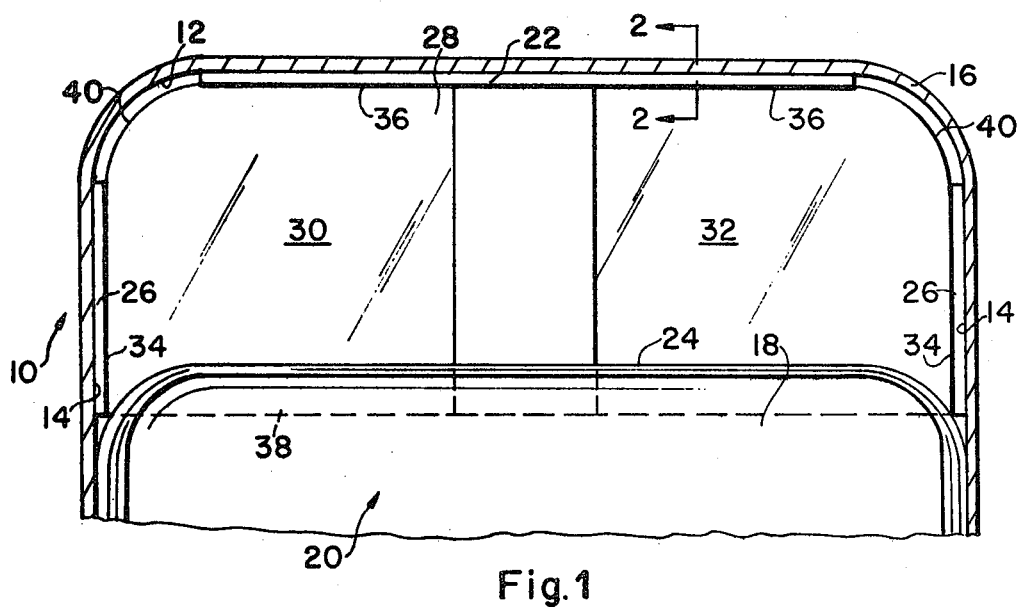
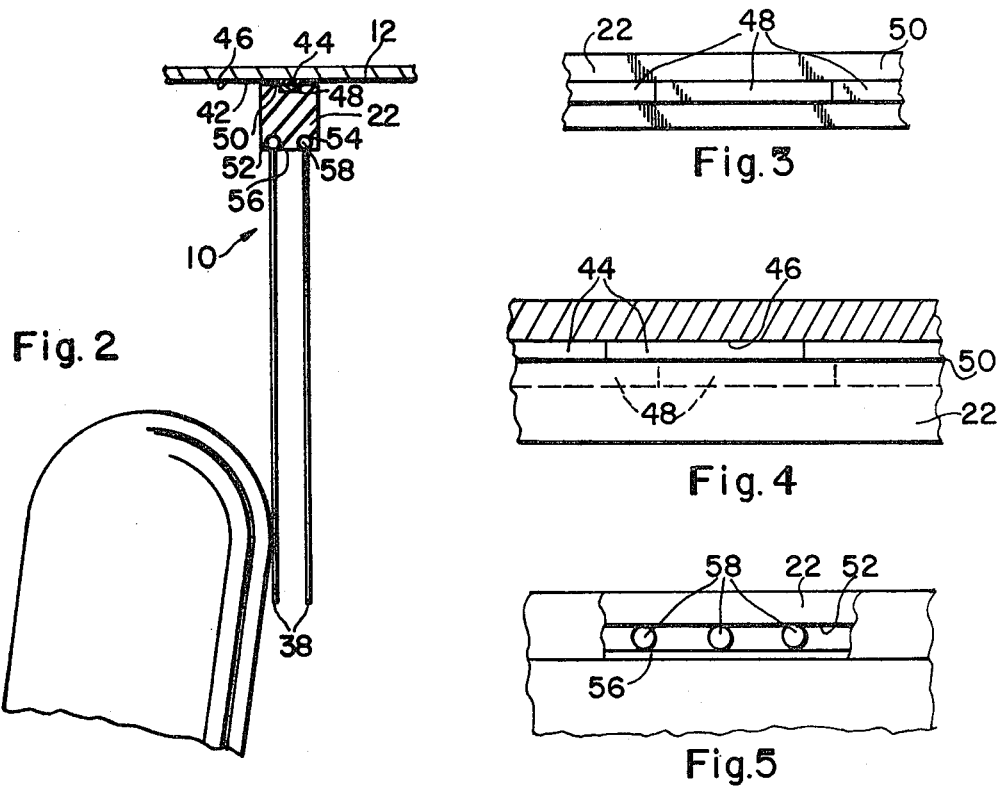

AIR PARTITION FOR AUTOMOBILE PASSENGER COMPARTMENTS

BACKGROUND OF THE INVENTION

1. Field of the Invention

The present invention relates to accessories for improving the heating and cooling abilities of an automobile, and more particularly, to an air partition for automobile passenger compartments.

2. Description of the Prior Art

Temperature control in an automobile or the like is very inefficient as the entire passenger compartment must presently be heated or cooled. If the rear seat of the vehicle is not in use the rear area of the vehicle is still cooled or heated. This is an especially troublesome problem with station wagons, vans, or the like where a large volume of air is cooled unnecessarily.

In order to overcome this problem and to permit more efficient cooling and heating of the occupied portion of an automobile or the like, the present invention provides an air partition which, when installed in an automobile passenger compartment, segregates the air space adjacent the front seat thereof from the balance of the area contained therein.

SUMMARY OF THE INVENTION

Therefore, a primary object of the present invention is to provide an air partition for automobile passenger compartments which effectively divides the front area of the automobile from the rear area thereof to increase cooling and heating efficiency in a partially occupied vehicle.

A further object is to provide an air partition which does not obstruct the view of the driver.

A still further object is to provide an air partition which is quickly, easily, and simply installed in an automobile or the like.

Still another object is to provide an air partition which may be installed in various types and models of motor vehicles.

Another object is to provide an air partition which is simple in design, inexpensive to manufacture, and durable.

These objects, as well as further objects and advantages of the present invention will become readily apparent after reading the description of a non-limiting illustrative embodiment and the accompanying drawing.

A partition for segregating the air space within the passenger compartment of an automobile or the like relative to the passenger seats thereof according to the principles of the present invention includes an elongated upper support track for removable affixment to the inner roof portion of an automobile, the track being located substantially above the backrest of a passenger seat provided by the automobile when installed therein; a plurality of side brackets for removable affixment to the opposed inner wall portions of the automobile, each of the plurality of brackets disposed in a plane defined by the upper support track and the backrest; and a transparent curtain being fixedly secured on the lateral free edges thereof to the side brackets; the uppermost free edge of the curtain being affixed to the elongated upper support track, the lower free edge of the curtain disposed in a touching relationship with the backrest.

BRIEF DESCRIPTION OF THE DRAWINGS

In order that the present invention may be more fully understood it will now be described, by way of example, with reference to the accompanying drawings in which:

FIG. 1 is a front view of the preferred embodiment incorporating the principle of the present invention installed in an automobile shown in cross-section;

FIG. 2 is a side-sectional view of the preferred embodiment taken substantially through the lines 2—2 of FIG. 1;

FIG. 3 is an enlarged fragmentary top view of the elongated upper support track of the preferred embodiment;

FIG. 4 is an enlarged fragmentary view of the upper support track of FIGS. 1 and 3 affixed to an automobile shown in section; and FIG. 5 is a partially broken away front view of the upper support track of the preferred embodiment.

DESCRIPTION OF THE PREFERRED EMBODIMENT

Referring now to the figures, and more particularly to FIG. 1, there is illustrated therein an air partition 10 removably secured to the inner roof portion 12 and the inner wall portions 14 of an automobile 16. The air partition 10 is installed above the backrest 18 of a passenger seat 20 located within the automobile 16. The air partition 10 includes an elongated upper support track 22 which is removably affixed to the inner roof portion 12 of the automobile 16 as shown in FIG. 4. The upper support track 22 is disposed substantially above the uppermost surface 24 of the backrest 18.

A plurality of side brackets 26 are removably secured to the inner wall portions 14 of the automobile 16 as hereinafter described. Each of the side brackets 26 is disposed substantially in a plane defined by the upper support track, and the uppermost surface 24 of the backrest 18. The upper support track 22 and the side brackets 26 are preferably constructed of a semi-flexible material such as plastic or the like to permit conformity with variously contoured vehicles.

A transparent flexible curtain 28 divided into two overlapping halves 30 and 32 is fixedly secured of the free lateral edges 34 thereof to the side brackets 26. The uppermost free edge 36 of the curtain 28 is slidably affixed to the elongated upper support track 22 as shown in FIG. 5. The lowermost free edge 38 of the curtain 28 is disposed in a touching relationship with the backrest effectively dividing the air space in front of the seat 20 from the air space therebehind. The transparent flexible curtain is preferably constructed of polyethelene or the like to permit trimming to conform to the inner contour of an automobile in which the partition 10 is to be installed. The rounded edges 40 have been shaped in this manner.

FIG. 2 illustrates the elongated upper support track 22 removably affixed to the inner roof portion 12 of the automobile 16 and is characteristic of the manner in which the side brackets 26 are removably secured to the inner wall portion 14.

The headliner 42 has been slit, and a plurality of ferrous plates 44 have been fixedly secured to the automobile roof 46 as also shown in FIG. 4. The ferrous plates 44 may be secured by epoxy or the like. If a rigid ferrous surface is uncovered by the slitting of the headliner the ferrous plates need not be used. In vehicles having rigid fiberboard headliners or the like, the ferrous plates may be fixedly secured directly thereto.

A plurality of magnets 48 are fixedly secured to the uppermost surface 50 of the upper support track 22 and may be counter sunk as shown. When the magnets 48 contact and magnetically engage the ferrous plates 44 or a ferrous surface provided by the automobile 16 the upper support track 22 is thereby removably affixed in position. The magnets 48 and the ferrous plates 44 may be supplied in semi-flexible strips.

A pair of longitudinal grooves 52 and 54 are located in the lowermost surface 56 of the elongated upper support track 22. A plurality of spherical elements 58 are fixedly secured to the uppermost free edge 36 of the curtain 28. The grooves 52 and 54 are dimensioned to capture and slidably retain therein the spherical elements 58 as further illustrated in FIG. 5.

FIG. 3 illustrates the plurality of magnets 48 fixedly secured to the uppermost surface 50 of the upper support track 22.

FIG. 4 illustrates a typical installation of the partition 10 with a plurality of ferrous plates 44 fixedly secured to the automobile roof 46. The plurality of magnets 48 are shown engaging the ferrous plates 44 and supporting the upper support track 22.

FIG. 5 illustrates the longitudinal groove 52 provided by the upper support track 22 capturing the plurality of spherical elements 58 and is also typical of the longitudinal groove 54. The spherical elements 58 are fixedly secured to the uppermost free edge 36 of the curtain 28. Resultantly, the curtain 28 may be opened and closed as desired by the user.

It will be understood that various changes in the details, materials, arrangements of parts and operation conditions which have been herein described and illustrated in order to explain the nature of the invention may be made by those skilled in the art within the principles and scope of the invention.

Having thus set forth the nature of the invention, what is claimed is:

1. A partition for segregating the air space within the passenger compartment of an automobile or the like relative to the passenger seats thereof comprising:

an elongated upper support track for removable affixment to the inner roof portion of an automobile, said track being located substantially above the backrest of a passenger seat provided by said automobile when installed therein;

a plurality of side brackets for removable affixment to the opposed inner wall portions of said automobile each of said plurality of brackets disposed in a plane defined by said upper support track and said backrest; and a transparent curtain being fixedly secured on the lateral free edges thereof to said side brackets, the uppermost free edge of said curtain being affixed to said elongated upper upper support track, the lowermost free edge of said curtain disposed in a touching relationship with said backrest, said curtain having two flexible halves each independently affixed to said elongated upper support track, a plurality of spherical elements, said plurality of spherical elements fixedly secured to said uppermost free edge of said curtain, said elongated upper support track providing at least one longitudinal groove therein, said groove for capturing and slidably engaging each of said plurality of spherical elements therein thereby permitting the opening and closing of said two flexible halves of said curtain .

2. A partition as claimed in claim 1, wherein said elongated upper support track further comprises a first plurality of magnets fixedly secured to the surface thereof disposed adjacent said inner roof portion of said automobile, said magnets for removable affixment thereto.

3. A partition as claimed in claim 2, further comprising a first plurality of ferrous plates adapted to be fixedly secured to said inner roof portion of said automobile, said ferrous plates positioned for magnetic engagement with said first plurality of magnets.

4. A partition as claimed in claim 1, wherein each of said plurality of side brackets further comprises a second plurality of magnets fixedly secured to the surface thereof disposed adjacent said inner wall portion of said automobile, said magnets for removable affixment thereto.

5. A partition as claimed in claim 4, further comprising a second plurality of ferrous plates adapted to be fixedly secured to said inner wall portion of said automobile, said second plurality of ferrous plates positioned for magnetic engagement with said second plurality of magnets.

6. A partition as claimed in claim 1, wherein said upper support track is constructed of a semi-flexible material.

7. A partition as claimed in claim 1, wherein said plurality of side brackets are each constructed of a semi-flexible material.

* * * * *